March 18, 1930. J. H. JOHNSON 1,750,758
PHOTOGRAPHIC CAMERA
Filed Feb. 1, 1929   2 Sheets-Sheet 2
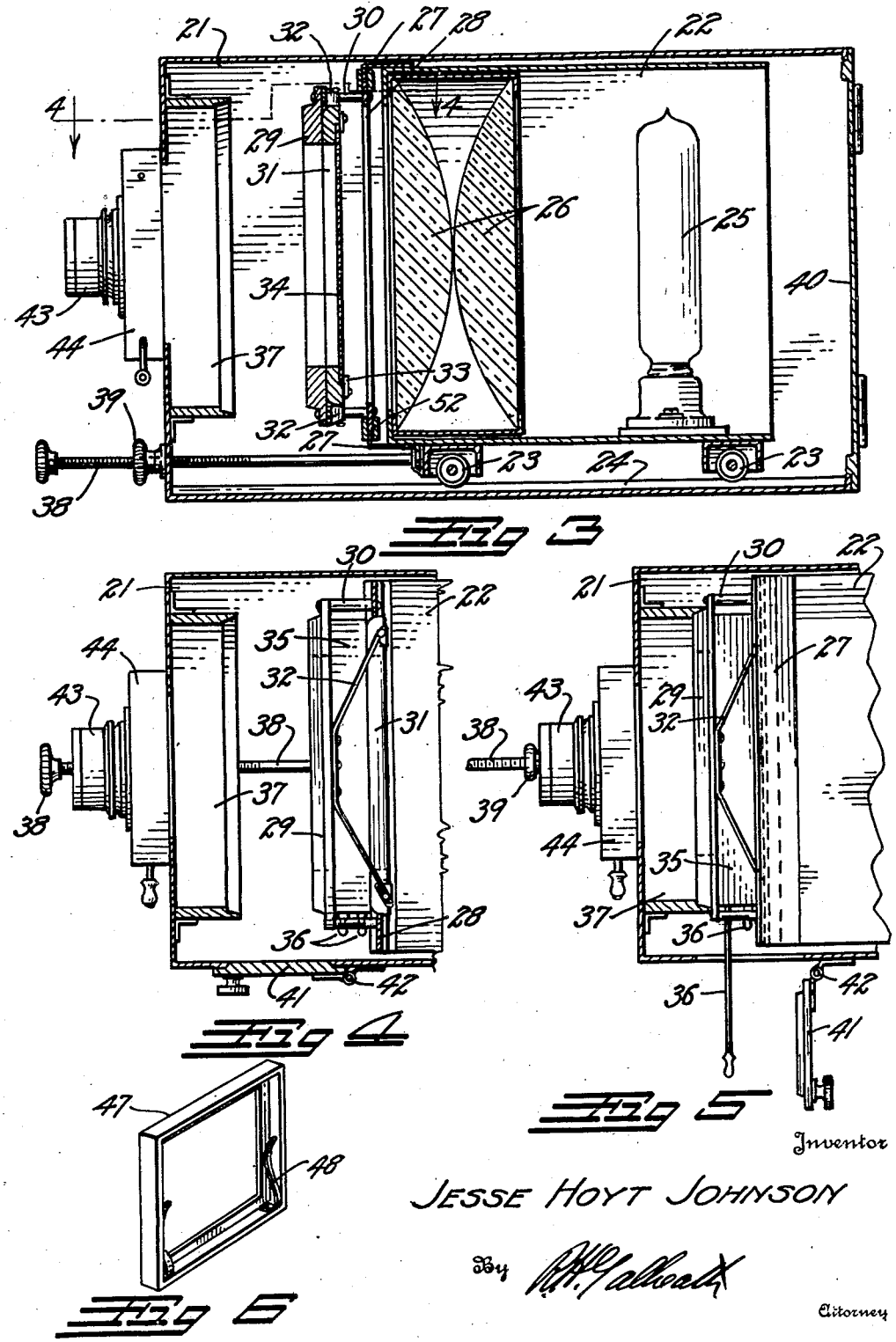

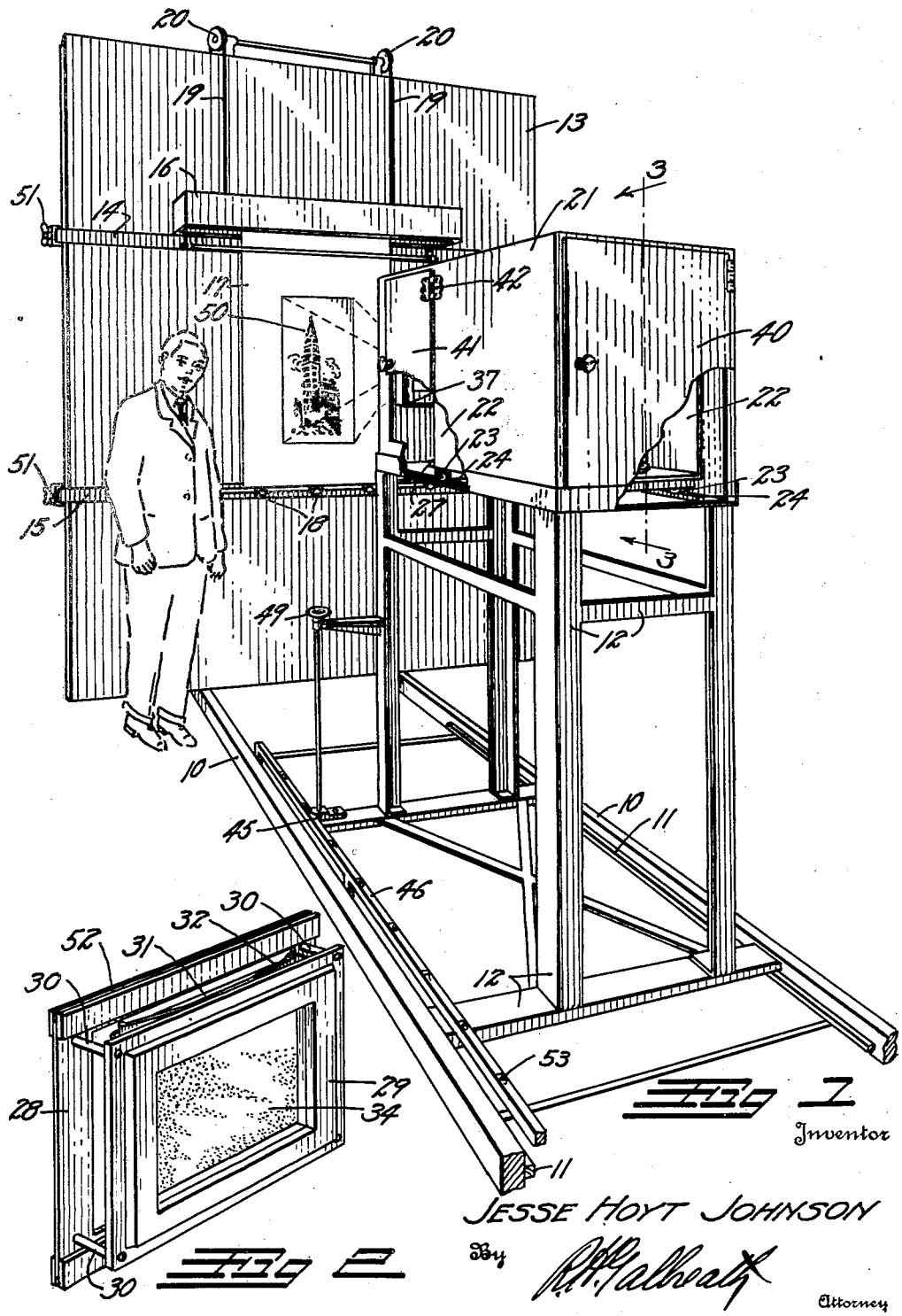

Patented Mar. 18, 1930

1,750,758

UNITED STATES PATENT OFFICE

JESSE HOYT JOHNSON, OF DENVER, COLORADO

PHOTOGRAPHIC CAMERA

Application filed February 1, 1929. Serial No. 336,743.

This invention relates to a photographic camera and projection device and is more particularly designed for use in photographic copying establishments where it is desired to make relatively large enlargements from small prints, drawings, and the like. The invention is designed as an improvement over the inventions disclosed in applicant's co-pending applications, Serial No. 289,960 and No. 289,961, filed July 2, 1928.

The principal object of the invention is to provide a device which can be quickly, easily and efficiently used to photograph upon a plate or film an image of a print or drawing and then used to project light through that print or film to print the image upon a sheet of sensitized paper upon a projection board.

Another object of the invention is to provide a combined and interchangeable camera and projecting device in which all focusing is done by movement of the plate or film while the lens remains stationary, and in which sensitive plates and films can be placed and exposed without it being necessary to operate the device in a dark room and without interference with the light projecting elements of the device.

A further object of the invention is to provide means for allowing the image to be focused upon a ground glass and then permanently locating the focal point so that the device can be again returned to the accurately focused position without requiring refocusing.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawing and throughout the description.

In the drawing:

Fig. 1 is a perspective view illustrating my complete apparatus in use. In this view the camera box has been partly broken away to disclose the interior construction.

Fig. 2 is a detail perspective view of the focusing and plate holder slide used in the device.

Fig. 3 is a vertical longitudinal section through the camera box of the device, taken on the line 3—3, Fig. 1.

Fig. 4 is a fragmentary horizontal section through the camera box taken on the line 4—4, Fig. 3, illustrating a plate holder in place therein.

Fig. 5 is a similar section illustrating the plate holder slide moved into contact with the light shield so as to protect the sensitized plate from light rays while the side door is opened to remove or replace the plate holder slide.

Fig. 6 illustrates a frame which may be used to hold a developed plate or film in the device for projection purposes.

The invention comprises a pair of parallel tracks 10 adapted to rest upon the floor and provided with rails 11 upon which a camera supporting frame 12 rides. At the extremities of the tracks 10 a vertical projection board 13 is placed and provided with simultaneously moving horizontal paper guides 14 and 15. The paper guides 14 and 15 are connected at the rear of the board 13 by means of cables (not shown) so that they will simultaneously move away from and toward each other as described in applicant's copending application No. 289,960. They may be clamped in any desired position by means of board clamps 51. The mechanism for operating the guides 14 and 15 forms no part of the present invention and is not illustrated in detail herein.

The upper guide 14 carries a roll box 16 in which a roll of sensitized printing paper is carried and from which a strip of sensitized paper 17 can be withdrawn and clamped to the lower guide 15 by means of suitable paper clamps 18. The weight of the roll box 16 is counterbalanced by means of suitable counterweights (not shown) upon the back of the board 13 connected therewith by means of suitable cables 19 trained over pulleys 20 at the top of the board 13.

The photographic and light projecting portion of the device is supported upon the camera frame 12 and comprises an outer or camera box 21 within which an inner or light box 22 is arranged to travel longitudinally. The light box 22 is supported upon wheels 23 which travel upon tracks 24 within the camera box 21. The light box 22 contains the usual projection bulb, 25, and a pair of condensing lenses 26. Extending across the top and bottom of the forward face of the light box 22 are L-shaped tracks 27 arranged to engage in a groove 52 in a plate holder slide 28 and support the latter before the condensing lenses 26.

Means are provided on the plate holder slide 28 to support an ordinary camera plate holder 35 in place. These means comprise a fixed frame 29 spaced away from and supported on the plate holder slide by means of stud posts 30.

A clamping frame 31 is carried by the fixed frame 29 upon leaf springs 32 which constantly clamp the clamping frame 31 against the fixed frame and against the plate holder 35 if the latter is in position therebetween. The clamping frame 31 is provided with clips 32 by means of which a ground glass 34 or developed plates or films may be held in place thereon. By forcing the clamping frame rearwardly the plate holder 35 may be inserted between the fixed frame 29 and the clamping frame, as illustrated in Figs. 3 and 4.

The usual plate holder, such as illustrated at 35, comprises a frame or box adapted to receive two plates, one at its front and one at its back, each plate being covered by means of a light slide 36 which, when withdrawn, exposes the plate for photographic purposes. To prevent light from striking the exposed plates while the light slide 36 is withdrawn or replaced, I provide a light box or shield 37 inside of the forward face of the camera box 21, the use of which will be later described.

The light box 22 is moved for focusing purposes within the camera box 21 by means of a focusing rod 38 which extends through the forward face of the camera box. The focusing rod 38 carries a lock nut 39 threaded thereon to set it any desired position. The rear face of the light box 22 is open. The rear face of the camera box 21 is provided with a hinge door 40 for focusing purposes. A relatively narrow door 41 is provided in the side of the camera box 21 and maintained closed by means of spring hinges 42. The front of the camera box carries the usual lens 43 and shutter 44.

Let us assume that it is desired to photograph a drawing which has been placed upon the projection board 13. The camera box 21 is moved to or from the drawing until the desired size of image is obtained. It can then be clamped in position by means of a hand wheel 49 operating a clamp 45 which engages a clamp rail 46 adjacent one of the tracks 11. The clamp rail carries numerals such as shown at 53 by means of which the operator can set the position of the camera box so as to obtain the exact reduction desired between the photographic plate and the drawing upon the board 13.

The light box 22 is now moved forwardly or rearwardly within the camera box 21 while the operator watches and focuses the image on the ground glass 34 through the rear door 40 and through the condensing lenses 26.

When the desired sharpness of focus has been obtained the rear door 40 is closed and the lock nut 39 is tightened against the front of the camera box 21 to set the focus position. The focusing rod 38 is now withdrawn until the projecting front of the fixed frame 29 enters the light shield as illustrated in Fig. 5, thereby sealing the space within the shield from the interior of the camera box. The plate holder 35 is now put in position between the frames 29 and 31, through the side door 41, similar to placing it in any ordinary camera back and the forward slide 36 is withdrawn as indicated in Fig. 5.

The door 41 is now allowed to close and the focusing rod 38 is forced inwardly until the lock nut 39 contacts with the forward face of the camera box. The operator, now knowing that his plate is in perfect focus, exposes the plate by means of the shutter 44 and obtains an image of the drawing which is on the board 13 to an exact scale reduction.

After the exposure, the focusing rod 38 is again drawn outwardly to form a light tight joint between the fixed frame 29 and the light shield 37. When this is done the side door 41 can be opened without danger of light striking the exposed face of the sensitive plate and the slide 36 inserted. The entire plate holder 35 can now be removed to the dark room for development of the plate.

Let us assume that it is desired to project an image of the developed plate upon a sheet of sensitized paper upon the projection board 13 for enlarging purposes. The plate can be placed in the clamping frame 31 in place of the ground glass 34 by means of the clips 33, if desired, or it can be placed in a special plate holder, such as illustrated at 47, in Fig. 6. The plate holder 47 is provided with an open back for the passage of the light rays and with spring plate clamps 48 for holding the plate in place. If a film is used it is placed between two glass plates in the holder 47. The holder 47 is now inserted between the frames 29 and 31 and the camera frame 12 is moved along the tracks 10 until the indications 53 on the rail 46 indicate the desired scale enlargement. The room is now darkened and the bulb is lighted and the image is focused upon the board 13 by movement of the focusing rod 38. When the desired focus has been obtained the shutter 44 is closed and the sensitized paper 17 is pulled into position as illustrated in Fig. 1. The exposure is now made by means of the shutter, the image appearing as illustrated at 50, Fig. 1.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. A photographic camera comprising: a camera box; a lens arranged at one extremity of said box; a supporting member longitudinally movable within said box; means for detachably mounting a plate holder upon said supporting member; a plate within said plate holder; means for sealing said plate from the interior of said box, so as to prevent exposure of said plate when said box is opened, said means comprising: a projecting frame within one extremity of said box adapted to contact with said mounting means when said supporting member is at one extremity of its movement.

2. A photographic camera comprising: a camera box; a lens arranged at one extremity of said box; a supporting member longitudinally movable within said box; means for detachably mounting a plate holder upon said supporting member; a plate within said plate holder; means for sealing said plate from the interior of said box, so as to prevent exposure of said plate when said box is opened, said means comprising: a projecting frame within one extremity of said box adapted to contact with said mounting means when said supporting member is at one extremity of its movement; and a door in said camera box positioned so as to be adjacent said plate holder when said mounting means is in contact with said projecting frame so as to allow access to said plate holder from the exterior of said box.

3. A photographic camera comprising: a camera box; a lens arranged at one extremity of said box; a supporting member longitudinally movable within said box; means for detachably mounting a plate holder upon said supporting member; a plate within said plate holder; means for sealing said plate from the interior of said box, so as to prevent exposure of said plate when said box is opened, said means comprising: a projecting frame within one extremity of said box adapted to contact with said mounting means when said supporting member is at one extremity of its movement; and means operable from the exterior of said box for moving said supporting member into contact with said projecting frame.

4. A photographic camera comprising: a camera box; a lens arranged at one extremity of said box; a supporting member longitudinally movable within said box; means for detachably mounting a plate holder upon said supporting member; a plate within said plate holder; means for sealing said plate from the interior of said box, so as to prevent exposure of said plate when said box is opened, said means comprising: a projecting frame within one extremity of said box adapted to contact with said mounting means when said supporting member is at one extremity of its movement; and means operable from the exterior of said box for moving said supporting member into contact with said projecting frame, said means comprising: a rod adapted to project through the wall of said box; and a locking member carried by said rod so as to limit its movement to any desired extent.

In testimony whereof, I affix my signature.

JESSE HOYT JOHNSON.